July 31, 1962     P. L. SALVATORI     3,046,668
BIFOCAL MARKING DEVICE FOR CONTACT LENS BLANKS
Filed Jan. 4, 1961
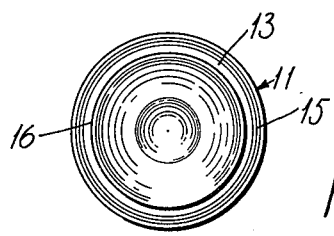
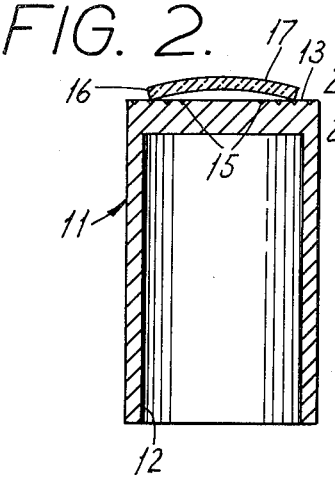
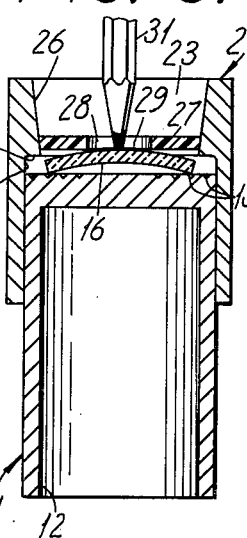
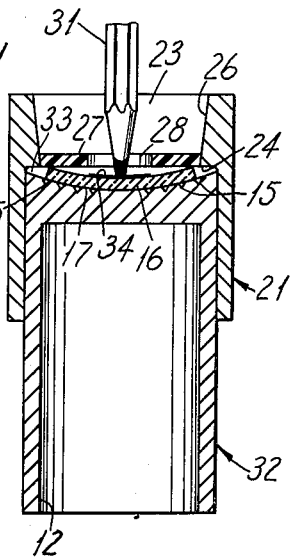
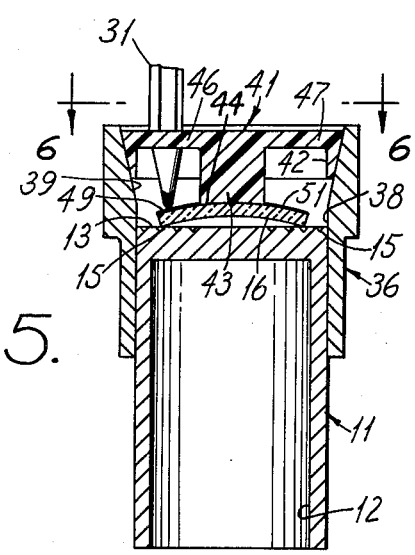
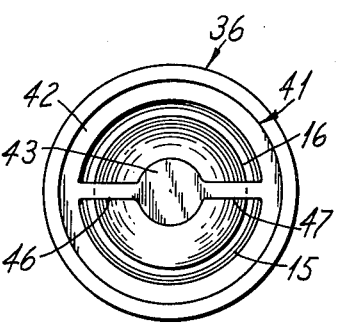
INVENTOR
PHILIP L. SALVATORI
BY Richard Rawling
ATTORNEY

United States Patent Office 3,046,668
Patented July 31, 1962

1

3,046,668
BIFOCAL MARKING DEVICE FOR CONTACT
LENS BLANKS
Philip L. Salvatori, Sarasota, Fla., assignor to Obrig Laboratories Inc., New York, N.Y., a corporation of New York
Filed Jan. 4, 1961, Ser. No. 80,578
4 Claims. (Cl. 33—174)

The present invention relates generally to a device for use in marking bifocal contact lenses, and it has particular relation to a lens holder for supporting a contact lens blank and a cap to facilitate marking opaquely specific areas thereof.

Bifocal contact lenses are an entirely new development in this field and there is no comparable device known in the art.

An object of the invention is to provide a device which will enable checking a patent's eyes before a lens is ground to determine which, if any, type of bifocal lens may be worn conveniently by the patient.

Another object of the invention is the provision of a device whereby it can be determined in advance whether a patient requires the reading portion of the lens to be ground centrally thereof and the distance portion of the lens to be ground circumferentially thereof, or vice versa.

A further object of the invention is to provide a simple, durable and inexpensive lens holder provided with a curved top surface applicable for receiving a contact lens blank.

Another object of the invention is the provision of a suitable lens holder provided with markings which will facilitate mounting a lens blank axially thereof.

A further object of the invention is to provide a simple, durable and inexpensive cap member adapted to fit removably and telescopically over the lens holder and provided with an aperture or apertures to enable marking opaquely specific areas of a lens blank mounted therebetween.

Other and further objects and advantages of the invention reside in the details of construction of the lens holding devices, which result in simplicity, economy and efficiency, and which will be apparent from the following description, wherein preferred embodiments of the invention are shown, reference being had to the accompanying drawings, forming a part hereof, wherein like numerals indicate like parts, in which:

FIGURE 1 is a top plan view of a supporting device having a lens blank mounted thereon, which adapted for use in marking an area of a contact lens blank;

FIGURE 2 is a vertical cross-sectional view of lens holder and lens blank shown in FIGURE 1;

FIGURE 3 is a vertical cross-sectional view of the marking assembly, showing the lens holder and lens blank of FIGURE 2 with its tubular top member mounted thereon, and illustrating the manner in which the central portion of a lens blank may be rendered opaque by means of a crayon marking pencil;

FIGURE 4 is a view similar to that shown in FIGURE 3, except that the opaque markings are being applied to the opposite side of the lens blank, which had been mounted in reverse position in the lens holding device;

FIGURE 5 is a vertical cross-sectional view of a modified tubular top member, wherein the marking aperture is made in the form of arcuate slots, showing the opaque markings may be applied by a crayon marking pencil to the circumferential area of the lens blank instead of its axial area; and FIGURE 6 is a top plan view of the assembly shown in FIGURE 5, the same having been taken substantially along the line 6—6 thereof, looking in the direction of the arrows, the same being shown with the marking pencil removed.

Referring now to the drawings and particular to FIGURES 1 to 3, both inclusive, there is shown a cylindrically shaped base member 11, having a recessed interior open at its bottom, as indicated at 12. This base member 11 may be made of metal, plastic or any other suitable materials, and its recess 12 has no function except to reduce its weight and the amount of material of which it is made. The top surface 13 of the base member 11 is in a horizontal plane and extends at right angles to the sides of the base member 11. The surface area 13 is provided with a series of marking indicia 15, which in the construction shown takes the form of spaced concentric circles or grooves cut into said surface area. These spaced circles or grooves 15 are formed concentrically of the longitudinal axis of the base member 11.

In FIGURE 2 a conventional contact lens blank 16 is shown positioned centrally of the surface area 13 of the base member 11 by means of the grooved markings 15 with its convex side 17 extending upwardly.

A tubular top member 21, which is tubular in shape, has a recess 22 open at its bottom and extending upwardly. The recess 22 is of a size and shape adapted to fit snugly and telescopically over the top and sides of the base member 11. The bottom recess 22 is larger in diameter than the upper recess 23 of the cap member 21, and has an inward radially extending projection 24, which serves as a stop against the top of the base member 11. The upper recess 23 of the cap member 21 has outwardly and upwardly sloping sides 26. A template in the form of a plastic disk 27, having a central aperture 28, is wedgingly fitted into the lower end of the upper recess 23. While it is substantially fixed in its position for all extents and purpose, it can be driven out, if desired, when it becomes worn or broken. The central aperture 28 of the template disk 27 is of a diameter equal to the central area of a contact lens blank 16, which is to be ground for corrective vision. This area of the lens blank 16 may be rendered opaque, as indicated at 29, by means of a conventional crayon or glass plastic type marking pencil 31.

Referring now to FIGURE 4, the tubular top member 21 is identical to that shown in FIGURES 1 to 3, but the base member 32 has been slightly modified to provide a top surface area 33 of concave shape to conform substantially to the convex curvature 17 of the lens blank 16. It is provided with identical marking grooves 15. The conventional lens contact blank 16 is shown in a reverse position, viz.: with its convex side adjacent the concaved top surface area 33. It is possible, in this position to place the opaque markings 34 on the inner or concave surface of the lens blank 32. In a few instances, it has been found advisable to grind the corrective vision on the inside or concave side of the blank instead of on the convex side as it is usually done. When such a situation occurs, it has been found desirable to opaque the corrective side of the lens in making the tests necessary to determine if the patient may be fitted with bifocal contact lenses. Normally, it is not desirable to place the crayon markings on the lens blank on the surface adjacent to the patient's cornea. While such marking pencils are normally innocuous to the eye, there is a possibility a patient may be allergic to such crayon markings. Hence, the reason for making the test markings on both sides of the lens blank.

There is shown in FIGURES 5 and 6, a base member 11, which identical to that shown and described in FIGURES 1 to 3, both inclusive. However, in this modification, the tubular top member 36 is entirely different from the tubular top member 21. The tubular top member 36 consists of a tubular sleeve having an axial recess in which the lower portion 38 is of a size and shape to fit telescopically over the base member 11. The upper portion of the axial recess is enlarged by being provided with outwardly sloping sides 39, and is adapted to receive a plastic disk member 41. The disk member 41 has a downwardly extending peripheral flange 42, which has its outer surface sloped inwardly to correspond with the outwardly sloping sides 39 of its axial recess. Obviously, the disk member 41 will fit snugly and telescopically into the upper portion 39 of the axial recess until its top surface area is entirely within the same. The disk member 41 has a spider construction wherein its central area is provided with a depending axial projecting member 43, the lower end 44 of which is arcuate in shape and adapted to fittingly engage the convex central area of a conventional contact lens blank 16 centered on the top surface area 13 of the base member 11. Radially extending arms 46 and 47 extend diammetrically and connect the axial projecting member 43 with the sides of the disk member 41 for supporting the same centrally thereof. With a conventional crayon pencil 31, it is now possible to block-out or render opaque sections 49 and 51 of the outer peripheral lens area, whereby only the central axial area covered by the projecting member 43 will be clear for visual purposes. In this construction, the blocked-out areas will be unjoined arcuate sections. These may be connected by continuing said markings by free hand with the marking pencil 31, whereby the entire perimetrical area of said blank may be rendered opaque.

Contact lenses have developed exceptionally fast in the past ten years, but up to recently they have been made with only one corrective lens, to wit: either reading or distance, as the patient required. With the rapid development of such lenses and the ability of patients to be able to wear them over long periods of time without removal, there is a demand for contact lenses with bifocal corrections. Such bifocal lenses will probably be made with the reading corrective lens about its peripheral edge and with the distance corrective lens in the center. Of course, there will be instances where a patient will require his or her lens in a reverse order of construction.

There is no great difficulty in determining the corrective grind for such patients, but, due to the cost and problem of fitting them, it has been found desirable to determine first if the patient will be able to wear and use them. With the device of the present invention, it is possible to take a lens blank, block-out by coloring or crayoning-in, the portion through which the patient will not be using, as for example, the reading portion when looking at distance, or vice versa. If the opaque cross-sectional area causes no serious problem with the patient's vision, it can be assumed he or she will be capable of wearing bifocal contact lenses without unsurmountable difficulties. Manifestly, any patient must learn to wear a contact lens regardless of its construction, and the difficulties in this respect greatly exceed those found in fitting patients with conventional corrective glasses.

Although I have shown and described but two forms which the invention may assume, it will be readily apparent to those skilled in the art that the same is not to be so limited, but that many other modifications may be made therein without departing from the spirit thereof or from the scope of the appended claims.

What I claim is:

1. A marking device for bifocal contact lenses comprising a base member having a top surface area for supporting a lens blank, said top surface area having indicia for centering said lens blank thereon, and a tubular top member to be mounted telescopically over the top of said base member, said top member having a templet mounted therein made of a material incapable of scratching said lens blank, said lens blank being holdingly engaged by said template, said templet having an aperture corresponding to the shape of the marking to be applied to said lens blank, whereby a marking device may be projected through said aperture in said templet to block out a corresponding area on said lens blank.

2. A marking device for bifocal contact lenses comprising a base member having a top surface area for supporting a lens blank, said top surface area having indicia for centering said lens blank thereon, a tubular top member to be mounted telescopically over the top of said base member, said top member having means intermediate its inside surface for limiting the distance it may be mounted on said base member, said top member having a templet mounted removably therein above said limiting means made of a material incapable of scratching said lens blank, said lens blank being holdingly engaged by said template, said templet having an aperture corresponding to the shape of the marking to be applied to said lens blank, whereby a marking device may be projected through said aperture in said templet to block out a corresponding area on said lens blank.

3. A marking device for bifocal contact lenses comprising a base member having a top surface area for supporting a lens blank, said surface area having visual indicia for centering said lens blank centrally thereof, and a tubular top member to be mounted telescopically over the top of said base member, the aperture through said top member having an upper section with downwardly converging sides terminating into a lower section of a larger cross-section to form a shoulder for limiting the distance said top member may be telescoped over said base member, said upper section of said top member having a templet made of a material incapable of scratching said lens blank, said lens blank being holdingly engaged by said template, said templet having an aperture corresponding to the shape of the marking to be applied to said lens blank, whereby a marking device may be projected through said aperture in said templet to block out a corresponding area in said lens blank.

4. A marking device for bifocal contact lenses which consists of a base member of substantial height as compared to its width dimensions having an upper surface area capable of supporting a lens blank, said surface area being scored with a series of radially spaced concentric circles to facilitate mounting said lens blank centrally thereof, and a tubular top member having a template made of material that cannot scratch a lens blank mounted removably therein intermediate its ends, said insert member having an aperture therethrough of a size and shape to correspond to a corrective portion of said lens blank, said top member having a construction which fits telescopically over said base member until its disk member engages said lens blank and wedges it tightly against the supporting surface area of said base member, whereby a marking device projected through said aperture in said insert member may be used to render the corresponding area of said lens blank opaque.

References Cited in the file of this patent

UNITED STATES PATENTS

| | | |
|---|---|---|
| 63,814 | Richards | Apr. 16, 1867 |
| 312,227 | Taft | Feb. 10, 1885 |
| 1,648,500 | Newell et al. | Nov. 8, 1927 |
| 1,838,616 | Glancy | Dec. 29, 1931 |
| 2,031,380 | McCabe | Feb. 18, 1936 |